(12) United States Patent
Spruce et al.

(10) Patent No.: US 10,975,843 B2
(45) Date of Patent: Apr. 13, 2021

(54) WIND TURBINE CONTROL BASED ON FORECASTS

(71) Applicant: VESTAS WIND SYSTEMS A/S, Aarhus N (DK)

(72) Inventors: Chris Spruce, Leatherhead (GB); Kelvin Hales, Surrey (GB); Judith Turner, Dorking (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 72 days.

(21) Appl. No.: 15/736,705

(22) PCT Filed: Jun. 22, 2016

(86) PCT No.: PCT/DK2016/050211
§ 371 (c)(1),
(2) Date: Dec. 14, 2017

(87) PCT Pub. No.: WO2017/000955
PCT Pub. Date: Jan. 5, 2017

(65) Prior Publication Data
US 2018/0187648 A1  Jul. 5, 2018

(30) Foreign Application Priority Data

Jun. 30, 2015  (DK) .................. 2015 70413

(51) Int. Cl.
*F03D 7/02* (2006.01)
*F03D 7/04* (2006.01)
*F03D 9/25* (2016.01)

(52) U.S. Cl.
CPC .......... *F03D 7/0292* (2013.01); *F03D 7/028* (2013.01); *F03D 7/048* (2013.01); *F03D 9/255* (2017.02);
(Continued)

(58) Field of Classification Search
CPC ....... F03D 7/0292; G05B 19/042; F02C 9/28; F02C 9/00; F05D 2270/07; F05D 2270/2639; F01D 15/10
(Continued)

(56) References Cited

U.S. PATENT DOCUMENTS 9,835,135 B2 * 12/2017 Draper .................... F03D 7/028
2010/0283245 A1 * 11/2010 Gjerlov ................. F03D 7/0224
290/44

(Continued)

FOREIGN PATENT DOCUMENTS

CN     1975155 A     6/2007
CN     101413483 A   4/2009
(Continued)

OTHER PUBLICATIONS

Danish Patent and Trademark Office Search Report for Application No. PA 2015 70413 dated Jan. 29, 2016.
(Continued)

*Primary Examiner* — Rocio Del Mar Perez-Velez
*Assistant Examiner* — Alicia M. Choi
(74) *Attorney, Agent, or Firm* — Patterson + Sheridan, LLP

(57) ABSTRACT

A wind turbine, power plant and associated method of controlling a wind turbine is provided. Data is obtained that identifies, based on forecast data, one or more future periods of time during which it would be desirable to over-rate the wind turbine, and measures of the fatigue life consumed by one or more turbine components are determined. The total fatigue life consumed by the one or more turbine components is limited prior to the one or more periods of time by controlling the power output of the wind turbine, in advance
(Continued)

of the one or more periods of time, based upon the measure of the fatigue life consumed by the one or more turbine components.

24 Claims, 9 Drawing Sheets

(52) U.S. Cl.
CPC ... *F05B 2220/706* (2013.01); *F05B 2270/109* (2013.01); *F05B 2270/1033* (2013.01); *F05B 2270/32* (2013.01); *F05B 2270/327* (2013.01); *F05B 2270/332* (2013.01); *F05B 2270/337* (2013.01); *F05B 2270/404* (2013.01); *Y02E 10/72* (2013.01)

(58) Field of Classification Search
USPC .......................................................... 700/287
See application file for complete search history.

(56) References Cited

U.S. PATENT DOCUMENTS

| | | | | | |
|---|---|---|---|---|---|
| 2010/0298995 | A1* | 11/2010 | Zhang | ................... | F03D 7/0292 700/287 |
| 2012/0133138 | A1* | 5/2012 | Sorensen | ................ | F03D 7/028 290/44 |
| 2013/0035798 | A1* | 2/2013 | Zhou | .................... | F03D 7/0292 700/287 |
| 2013/0257051 | A1* | 10/2013 | Spruce | ................... | F03D 7/048 290/44 |
| 2013/0320674 | A1 | 12/2013 | Ingram | | |
| 2014/0152013 | A1* | 6/2014 | Spruce | .................. | F03D 7/0204 290/44 |
| 2014/0244328 | A1* | 8/2014 | Zhou | ...................... | G06Q 10/20 705/7.13 |
| 2014/0248123 | A1* | 9/2014 | Turner | .................. | F03D 7/0292 415/1 |
| 2014/0288855 | A1* | 9/2014 | Deshpande | ............. | F03D 17/00 702/34 |
| 2015/0003983 | A1* | 1/2015 | Coultate | ................. | F03D 7/043 416/1 |
| 2015/0115608 | A1* | 4/2015 | Draper | .................... | F03D 7/028 290/44 |
| 2015/0167637 | A1* | 6/2015 | Kooijman | ................ | F03D 7/02 416/1 |

FOREIGN PATENT DOCUMENTS

| | | |
|---|---|---|
| CN | 103237984 A | 8/2013 |
| CN | 103946540 A | 7/2014 |
| WO | 2012/041327 A2 | 4/2012 |
| WO | 2014149364 A1 | 9/2014 |
| WO | 2017000955 A1 | 1/2017 |

OTHER PUBLICATIONS

PCT International Search Report for Application No. PCT/DK2016/050211 dated Jun. 22, 2016.
PCT Written Opinion of the International Searching Authority for Application No. PCT/DK2016/050211 dated Jun. 22, 2016.
Chinese Office Action for Application No. 201680038997.7 dated Jan. 4, 2019.

\* cited by examiner

WIND TURBINE CONTROL BASED ON FORECASTS

Embodiments of the present invention relate to methods and control systems for use in protecting a wind turbine from excessive wear of components during over-rating periods determined by forecasts.

FIG. 1A illustrates a large conventional wind turbine 1, as known in the art, comprising a tower 10 and a wind turbine nacelle 20 positioned on top of the tower 10. The wind turbine rotor 30 comprises three wind turbine blades 32 each having a length L. The wind turbine rotor 30 could comprise another number of blades 32, such as one, two, four, five, or more. The blades 32 are mounted on a hub 34 which is located at a height H above the base of the tower. The hub 34 is connected to the nacelle 20 through a low speed shaft (not shown) extending from the front of the nacelle 20. The low speed shaft drives a gearbox (not shown) which steps up the rotational speed and, in turn, drives an electrical generator within the nacelle 20 for converting the energy extracted from the wind by the rotating blades 32 into electrical power output. The wind turbine blades 32 define a swept area A, which is the area of a circle delineated by the rotating blades 32. The swept area dictates how much of a given air mass is intercepted by the wind turbine 1 and, thus, influences the power output of the wind turbine 1 and the forces and bending moments experienced by the components of the turbine 1 during operation. The turbine may stand onshore, as illustrated, or offshore. In the latter case the tower will be connected to a monopile, tripod, lattice or other foundation structure, and the foundation could be either fixed or floating.

Each wind turbine has a wind turbine controller, which may be located at the tower base or tower top, for example. The wind turbine controller processes inputs from sensors and other control systems and generates output signals for actuators such as pitch actuators, generator torque controller, generator contactors, switches for activating shaft brakes, yaw motors etc.

FIG. 1B shows, schematically, an example of a conventional wind power plant 100 comprising a plurality of wind turbines 110, the controllers of each of which communicate with a power plant controller (PPC) 130. The PPC 130 may communicate bi-directionally with each turbine. The turbines output power to a grid connection point 140 as illustrated by the line 150. In operation, and assuming that wind conditions permit, each of the wind turbines 110 will output maximum active power up to their rated power as specified by the manufacturer.

FIG. 2 illustrates a conventional power curve 55 of a wind turbine, plotting wind speed on the x axis against power output on the y axis. Curve 55 is the normal power curve for the wind turbine and defines the power output by the wind turbine generator as a function of wind speed. As is well known in the art, the wind turbine starts to generate power at a cut-in wind speed $V_{min}$. The turbine then operates under part load (also known as partial load) conditions until the rated wind speed is reached at point $V_R$. At the rated wind speed the rated, or nominal, generator power is reached and the turbine is operating under full load. The cut-in wind speed in a typical wind turbine may be 3 m/s and the rated wind speed may be 12 m/s, for example. Point $V_{max}$ is the cut-out wind speed, which is the highest wind speed at which the wind turbine may be operated while delivering power. At wind speeds equal to, and above, the cut-out wind speed the wind turbine is shut down for safety reasons, in particular to reduce the loads acting on the wind turbine. Alternatively the power output may be ramped down as a function of wind-speed to zero power.

The rated power of a wind turbine is defined in IEC 61400 as the maximum continuous electrical power output that a wind turbine is designed to achieve under normal operating and external conditions. Large commercial wind turbines are generally designed for a lifetime of 20 to 25 years and are designed to operate at the rated power so that the design loads and fatigue life of components are not exceeded.

The fatigue damage accumulation rates of individual components in wind turbines vary substantially under different operating conditions. The rate of wear, or accumulation of damage, tends to increase as generated power increases. Wind conditions also affect rate of accumulation of damage. For some mechanical components, operation in very high turbulence causes a rate of accumulation of fatigue damage that is many times higher than in normal turbulence. For some electrical components, operation at very high temperatures, which may be caused by high ambient temperatures, causes a rate of accumulation of fatigue damage, such as insulation breakdown rate, that is many times higher than in normal temperatures. As an example, for generator windings, a 10° C. decrease in winding temperature may increase lifetime by approximately 100%.

Recently progress has been made in controlling turbines such that they can produce power at levels greater than the rated power, as indicated by shaded area 58 of FIG. 2. The term "over-rating" is understood to mean producing more than the rated active power during full load operation by controlling turbine parameters such as rotor speed, torque or generator current. An increase in speed demand, torque demand and/or generator current demand increases additional power produced by over-rating, whereas a decrease in speed, torque and/or generator current demand decreases additional power produced by over-rating. As will be understood, over-rating applies to active power, and not reactive power. When the turbine is over-rated, the turbine is run more aggressively than normal, and the generator has a power output which is higher than the rated power for a given wind speed. The over-rating power level may be up to 30% above the rated power output, for example. This allows for greater power extraction when this is advantageous to the operator, particularly when external conditions such as wind speed, turbulence and electricity prices would allow more profitable power generation.

Over-rating causes higher wear or fatigue on components of the wind turbine, which may result in early failure of one or more components and require a shutdown of the turbine for maintenance. As such, over-rating is characterised by a transient behaviour. When a turbine is over-rated it may be for as short as a few seconds, or for an extended period of time if the wind conditions and the fatigue life of the components are favourable to over-rating.

A particular method of controlling a wind turbine power plant is described in WO 2012/041327. A power plant controller varies the output of the power park above its rated power in response to external conditions, such as weather conditions or electricity pricing. When determining the extent to which turbines can be over-rated, the fatigue life of turbine components can be taken into account, enabling the lifetime of the turbine to be preserved and, where appropriate, additional revenue to be generated through over-rating.

The present invention aims to provide an improved method, and corresponding controller, for controlling wind turbines to maximise efficient use of over-rating, whilst protecting against premature ageing and fatigue-damage accumulation when implementing such a control strategy.

SUMMARY OF THE INVENTION

The invention is defined in the independent claims to which reference is now directed. Preferred features are set out in the dependent claims.

According to a first aspect of the invention there is provided a method of controlling a wind turbine. Data is obtained that identifies, based on forecast data, one or more future periods of time during which it would be desirable to over-rate the wind turbine, and measures of the fatigue life consumed by one or more turbine components are determined. The total fatigue life consumed by the one or more turbine components is limited prior to the one or more periods of time by controlling the power output of the wind turbine, in advance of the one or more periods of time, based upon the measure of the fatigue life consumed by the one or more turbine components. For example the overall rate of consumption of fatigue life by the one or more turbine components may be reduced prior to the one or more periods of time commencing. The wind turbine is then over-rated during the one or more identified periods.

By determining fatigue life consumed and controlling the power output so that the wind turbine component fatigue is minimised or reduced prior to the desired over-rating period, it is possible to reserve fatigue life to be expended during periods of higher value energy production. In particular, a disproportionately large amount of over-rating may be performed during favourable conditions such as low turbulence and/or high electricity prices without sacrificing component fatigue life. This allows a higher energy capture, and higher financial output, from a wind turbine or wind power plant.

The method may further include determining whether the fatigue life consumed by the one or more components exceeds respective threshold values. Limiting the fatigue life consumed by the one or more turbine components prior to the one or more periods of time may then only be applied when the fatigue life consumed by the one or more components exceeds the respective threshold values. The method may include repeating, continuously or at intervals, the steps of determining measures of the fatigue life consumed by one or more turbine components and determining whether the fatigue life consumed by the one or more components exceeds respective threshold values prior to the one or more periods of time; and modifying the power output of the wind turbine, when the fatigue life consumed by the one or more components exceeds the respective threshold values, to reduce the rate of consumption of fatigue life. The threshold values may be determined as the expected amount of fatigue damage incurred according to a predefined function, or as the expected amount minus an offset value.

Alternatively, the method may include determining the rate of consumption of fatigue life for the one or more components based upon the measures of the fatigue life consumed by one or more turbine components; and determining if the component rate of consumption of fatigue life exceed respective threshold values. Limiting the fatigue life consumed by the one or more turbine components prior to the one or more periods of time may then only be applied when component rate of consumption of fatigue life exceed the respective threshold values. The method may include repeating, continuously or at intervals, the steps of determining the rate of consumption of fatigue life for the one or more components and determining whether the rate of consumption of fatigue life for the one or more components exceeds the respective threshold values and modifying the power output of the wind turbine, when the rate of consumption of fatigue life for the one or more components exceeds the respective threshold values, to reduce the rate of consumption of fatigue life. The respective threshold values may be determined by comparing a desired value for fatigue life consumed at the start of a future period of time during which the wind turbine is to be over-rated and a current value for fatigue life consumed and selecting the thresholds based upon the difference between these values. In particular, the desired rate of consumption of fatigue life may be determined as the gradient of the line between these values.

The respective threshold values for fatigue life consumed may be determined from a desired or expected rate of accumulation of damage. The expected or desired rate may be a linear rate of accumulation of fatigue damage over the operating life of the turbine, or it may be based on a desired schedule for fatigue damage accumulation. The threshold may be equal to the desired or expected value for fatigue life at the point of determining measures of the fatigue life, or an offset may be applied to the expected or desired value.

The measures of the fatigue life consumed by one or more turbine components may be determined by obtaining values of variables affecting the fatigue lifetime of one or more of the wind turbine's components from turbine sensors and applying one or more Lifetime Usage Estimator algorithms to the variables to determine measures of the fatigue life consumed by each of the one or more turbine components. Lifetime usage estimations provide a useful indication of the amount of wear experienced by a given component as described below.

The data identifying the one or more future periods of time may be obtained by receiving forecast data forecasting one or more external conditions and determining, from the forecast data, periods during which one or more parameters from the forecast data are beyond a respective threshold or within a predetermined range.

The forecast data may include weather forecast data. The weather data may include wind speed data, the forecast parameters may include a wind speed, and the respective threshold is then a minimum wind speed or the predetermined range is a wind speed range, the step of determining periods during which one or more parameters from the forecast data are beyond a respective threshold or within a predetermined range comprising: determining periods during which the wind speed is above the threshold or within the predetermined range.

The weather data may also, or alternatively, include a forecast of turbulence intensity, and the respective threshold may be a maximum turbulence intensity, or the predetermined range may be a turbulence intensity range, the step of determining periods during which one or more parameters from the forecast data are beyond a respective threshold comprising: determining periods during which the turbulence intensity is below the threshold or within the predetermined range.

Controlling the power output of the wind turbine may comprise reducing the amount of over rating applied, or de-rating the turbine below rated power. Controlling the power output of the wind turbine may alternatively, or in addition, comprise reducing the power output in response to a signal indicative of turbulence during periods of high turbulence in which turbulence intensity exceeds a threshold value. Controlling the power output of the wind turbine may alternatively, or in addition, comprise reducing the power output in response to a signal indicative of electricity prices during periods of low price of electricity in which the price of electricity is less than a threshold value.

The forecast data may include a forward electricity price indicating the price of electricity at a defined future time.

Additionally, or alternatively, the forecast data may include an electricity price, and the respective threshold may be a minimum electricity price, the step of determining periods during which one or more parameters from the forecast data are beyond a respective threshold comprising: determining periods during which the price of electricity is above the threshold.

The method may further comprise controlling the power output of the wind turbine by preventing over-rating prior to the one or more periods. The method may further, or alternatively, comprise de-rating the wind turbine prior to the one or more periods.

The method may further comprise determining, at least once, the rate of consumption of fatigue life (RLU) for the one or more components; determining if the component RLUs exceed respective threshold values and, if so, controlling the power output of the wind turbine, in advance of the one or more periods of time, to limit the fatigue life consumed by the one or more turbine components prior to the one or more periods of time.

The method may be implemented in a wind turbine controller or at a wind power plant level controller.

According to a second aspect of the invention there is provided a controller for a wind turbine. The controller is configured to: in advance of one or more future periods of time identified based on forecast data, determine whether measures of fatigue life consumed by one or more turbine components exceed respective threshold values and, if so, send a control signal to control the power output of the wind turbine to limit the total fatigue life consumed by the one or more turbine components prior to the one or more periods of time; and during the one or more future periods of time, allow the wind turbine to be over-rated.

According to a third aspect of the invention there is provided a controller for a wind power plant. The controller is configured to, for each of a plurality of wind turbines: in advance of one or more future periods of time identified based on forecast data, determine whether measures of fatigue life consumed by one or more turbine components exceed respective threshold values and, if so, send a control signal to control the power output of the wind turbine to limit the total fatigue life consumed by the one or more turbine components prior to the one or more periods of time; and during the one or more future periods of time, allow the wind turbine to be over-rated.

BRIEF DESCRIPTION OF THE DRAWINGS

The invention will now be further described by way of example only and with reference to the accompanying figures in which.

DETAILED DESCRIPTION OF PREFERRED EMBODIMENTS

Embodiments of the invention relate to wind turbines, or to wind power plants, that are operated by over-rating. In general, an over-rating signal is generated, either at the power plant level, the individual turbine level, or elsewhere. The over-rating signal may then be acted upon at the power plant level, or by individual turbines, to achieve over-rating and therefore an increase in power output from individual turbines. The turbines may respond to the over-rating signal on an individual basis, depending upon the amount of fatigue life used by their various components.

The specific manner in which over-rating control signals are generated is not crucial to embodiments of the present invention, but an example will be given for ease of understanding.

Each wind turbine may include an over-rating controller, as part of the wind turbine controller. The over-rating controller calculates an over-rating request signal indicating an amount up to which the turbine is to over-rate the output above rated output. The controller receives data from the turbine sensors, such as pitch angle, rotor speed, power output etc and can send commands, such as set points for pitch angle, rotor speed, power output etc. The controller may also receive commands from the grid, for example from the grid operator to boost or reduce active or reactive power output in response to demand or a fault on the grid.

Figure 1A:
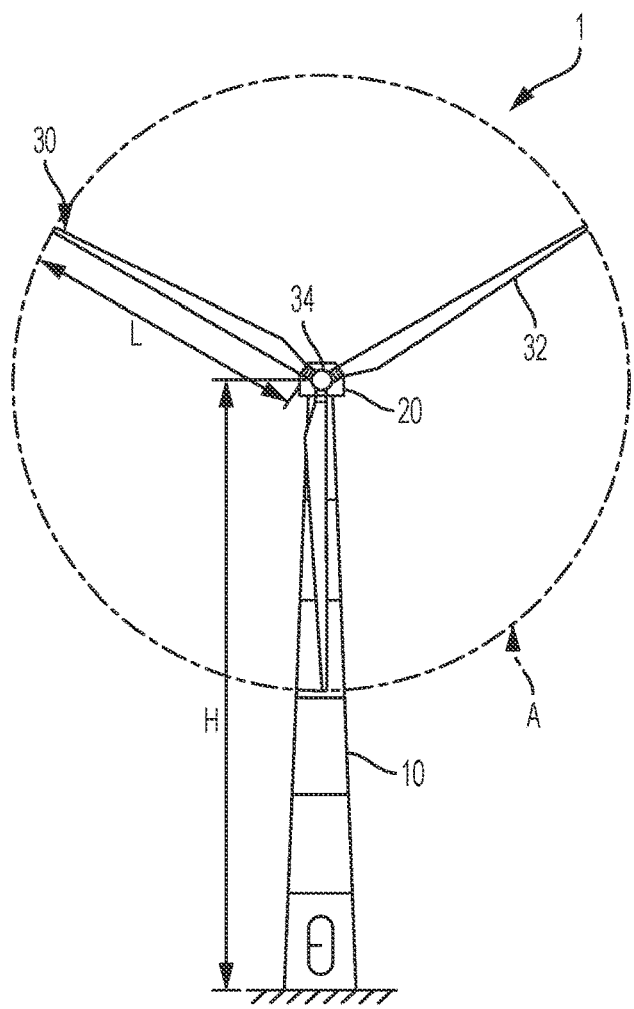
FIG. 1A is a schematic front view of a conventional wind turbine.
Figure 1B:
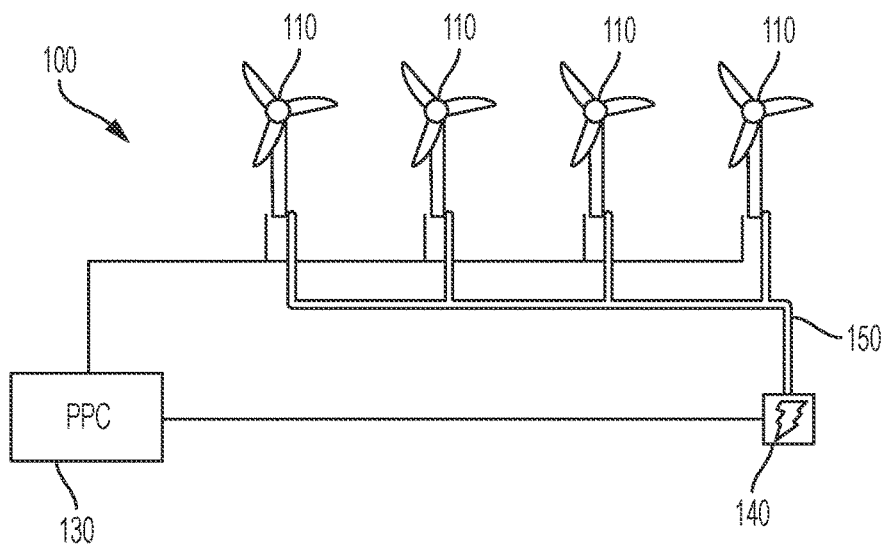
FIG. 1B is a schematic representation of a conventional wind power plant comprising a plurality of wind turbines.
Figure 2:
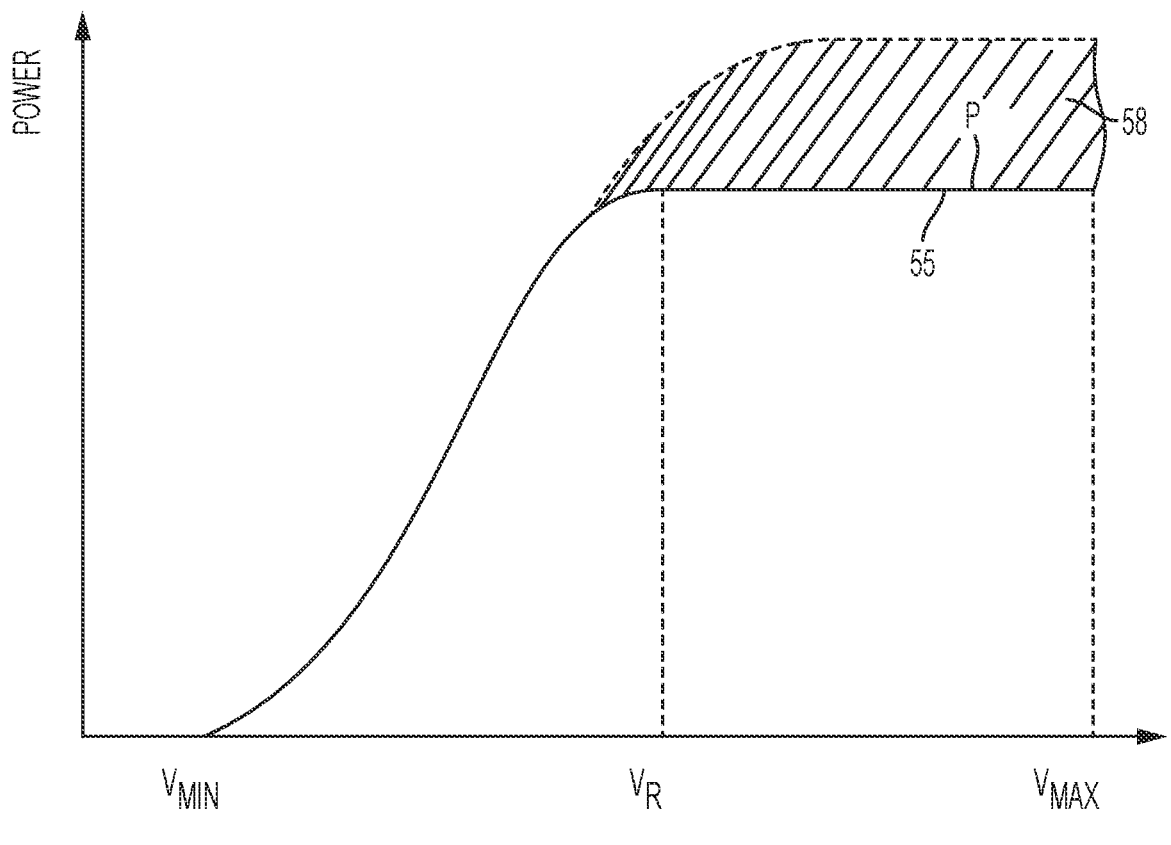
FIG. 2 is a graph illustrating a conventional power curve of a wind turbine.
Figure 3:
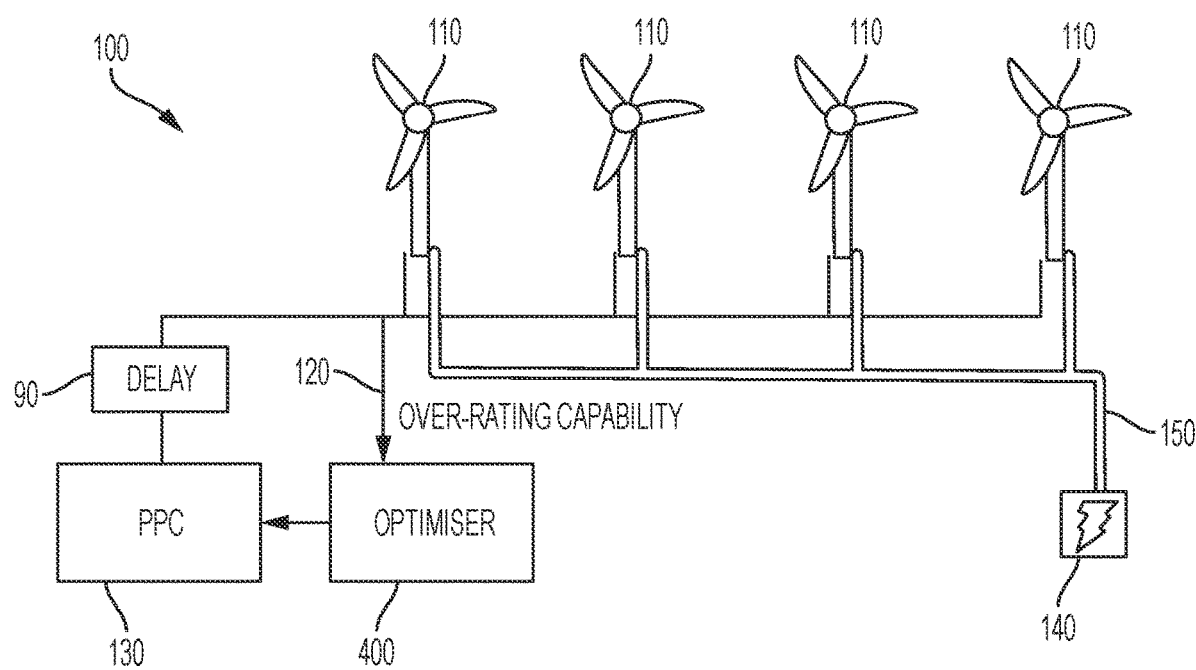
FIG. 3 is a schematic representation of a wind power plant having an over-rating optimiser for controlling individual turbine over-rating.

As an alternative, the over-rating controller may be part of the PPC controller 130 of FIG. 1B for example. The PPC controller communicates with each of the turbines and can receive data from the turbines, such as pitch angle, rotor speed, power output etc and can send commands to individual turbines, such as set points for pitch angle, rotor speed, power output etc. The PPC 130 also receives commands from the grid, for example from the grid operator to boost or reduce active or reactive power output in response to demand or a fault on the grid. Each wind turbine's controller communicates with the PPC 130.

The PPC controller 130 receives power output data from each of the turbines and is therefore aware of the active and reactive power output by each turbine and by the plant as a whole at the grid connection point 140. If required, the PPC controller 130 can receive an operating set point for the power plant as a whole and divide this among each of the turbines so that the output does not exceed the operator assigned set point. This power plant set point may be anywhere from 0 up to the rated power output for the plant. The "rated power" output for the plant is the sum of the rated power output of the individual turbines in the plant. The power plant set point may be above the rated power output of the plant, i.e. the whole plant is over-rated.

The PPC may receive an input directly from the grid connection, or it may receive a signal which is a measure of the difference between the total power plant output and the nominal or rated power plant output. This difference can be used to provide the basis for over-rating by individual turbines. In theory, only a single turbine may be over-rated, but it is preferred to over-rate a plurality of the turbines, and most preferred to send the over-rating signal to all the turbines. The over-rating signal sent to each turbine may not be a fixed control, but may instead be an indication of a maximum amount of over-rating that each turbine may perform. Each turbine may have a controller, which may be implemented within the turbine controller or centrally such as at the PCC, which will determine whether the turbine can respond to the over-rating signal and, if so, by what amount. For example, where the controller determines that conditions at a given turbine are favourable and above rated wind speed it may respond positively and the given turbine is over-rated. As the controllers implement the over-rating signal, the output of the power plant will rise.

An over-rating signal is therefore generated, either centrally or at each individual turbine, the signal being indicative of the amount of over-rating that may be performed by one or more turbines, or the turbines of the power plant as a whole.

Thus the over-rating of each turbine may be implemented via a power plant controller, either by generating a common over-rating command for each turbine or by generating an individual over-rating command for each turbine, or over rating may be implemented using individual turbine controllers. Over-rating may be applied whenever greater power extraction is required by the operator, particularly when external conditions such as wind speed, turbulence and electricity prices would allow more profitable power generation. Here, the price of electricity refers to the price paid to the wind turbine or power plant operator, rather than e.g. the price paid by a consumer or other.

The extent to which over-rating is used over the lifetime of an individual turbine may be controlled by each turbine responding to a common or individual over-rating signal or set point in a way that best suits itself. This calculation or assessment may be made either at the individual turbines as part of their central process, or at the PPC 30 which may perform the calculation individually for multiple turbines based on data received from those turbines. Thus, when the over-rating demand is received at each turbine from the PPC 30, each turbine processes and responds to this signal taking fatigue into account. A turbine may not over-rate at all, or may not over-rate at the level requested, if the effect on the fatigue lifetime of critical components is too great. Examples of critical components include the rotor blades, blade pitch systems, main bearing, gearbox, generator, converter, transformer, yaw system, tower and foundations. This will depend on the conditions at the turbine as well as the lifetime history of the turbine. For example, a turbine that is near the end of its life expectancy may be highly fatigued and so not suited to run at the over-rating level demanded. If the power plant output is insufficient, as some or all of the turbines are operating under the demanded over-rating level for fatigue saving, the over-rating demand will keep rising until it reaches its set-point or saturates.

According to embodiments of the invention, forecasts are used to predict periods of time in the future during which it would be desirable to over-rate a power plant or individual wind turbines. It is possible, using existing techniques, to predict external conditions and determine periods in the future when more profitable power generation can be achieved. Wind speed and other wind related conditions, such as turbulence intensity, may be predicted on the short or long term using any suitable method, many of which are known. Short term timescales are of the order of hours and days. Long term timescales are of the order of season-to-season or year-to-year. Prediction may use an analysis of previous weather patterns to determine a trend in current weather patterns in comparison to historical data, in addition to or as an alternative to long term forecasting.

Examples of computerised platforms that may be used in predicting future periods during which over-rating would be desirable include the VestasOnline™ PowerForecast, WeatherForecast and SeasonalForecast programs.

The PowerForecast platform provides a computerised system for providing site-specific power forecasts down to 10 minute intervals and is intended for use in the intraday and day-ahead energy markets. Historical site-specific meteorological data is processed through multiple weather models to build a meteorological history for the area of interest. This is combined with historical power production collected from individual turbines. Statistical methods are used to identify patterns between meteorological conditions at a site and single turbine power production under given conditions. These patterns are converted by a model selection that calculates the future power production for an individual turbine or a wind park.

The WeatherForecast platform provides a computerised system for providing weather forecasts for up to 10 days into the future at a given wind power plant location.

The SeasonalForecast platform provides a computerised system for providing power energy production forecasts up to 4 months into the future by using a climate library, seasonal weather forecasts and historical power performance data.

Future prices may be provided by the intraday and day-ahead markets. Electricity prices, or grid tariffs may also be predictable based on any suitable model, many examples of which are known. Again, prices may be predicted on short term timescales, of the order of hours and days, or long term timescales of the order of season-to-season or year-to-year. Such models may use many different variables to derive predicted prices, including past and present electricity prices, the proportion of electricity derived from different sources including wind power, the price of raw materials such as coal, oil and gas, and past, present and future expected consumption. Such models may also take into account whether other large non-intermittent power plants feeding into the same grid are scheduled to come online or offline in the future.

The abovementioned predictions are used to identify predicted periods of time during which it would be desirable to over-rate the wind turbine or wind power plant, either because wind conditions would be particularly favourable to generating extra power, or because electricity prices would improve plant profitability, or a combination of both. Over-rating is favourable, for additional power generation, when wind speed is sufficiently high for over-rating to be performed and turbulence is relatively low so that additional fatigue damage is minimised. Over-rating may also be favourable when electricity prices are high, provided the impact on component fatigue life usage is not prohibitive.

Figure 4:
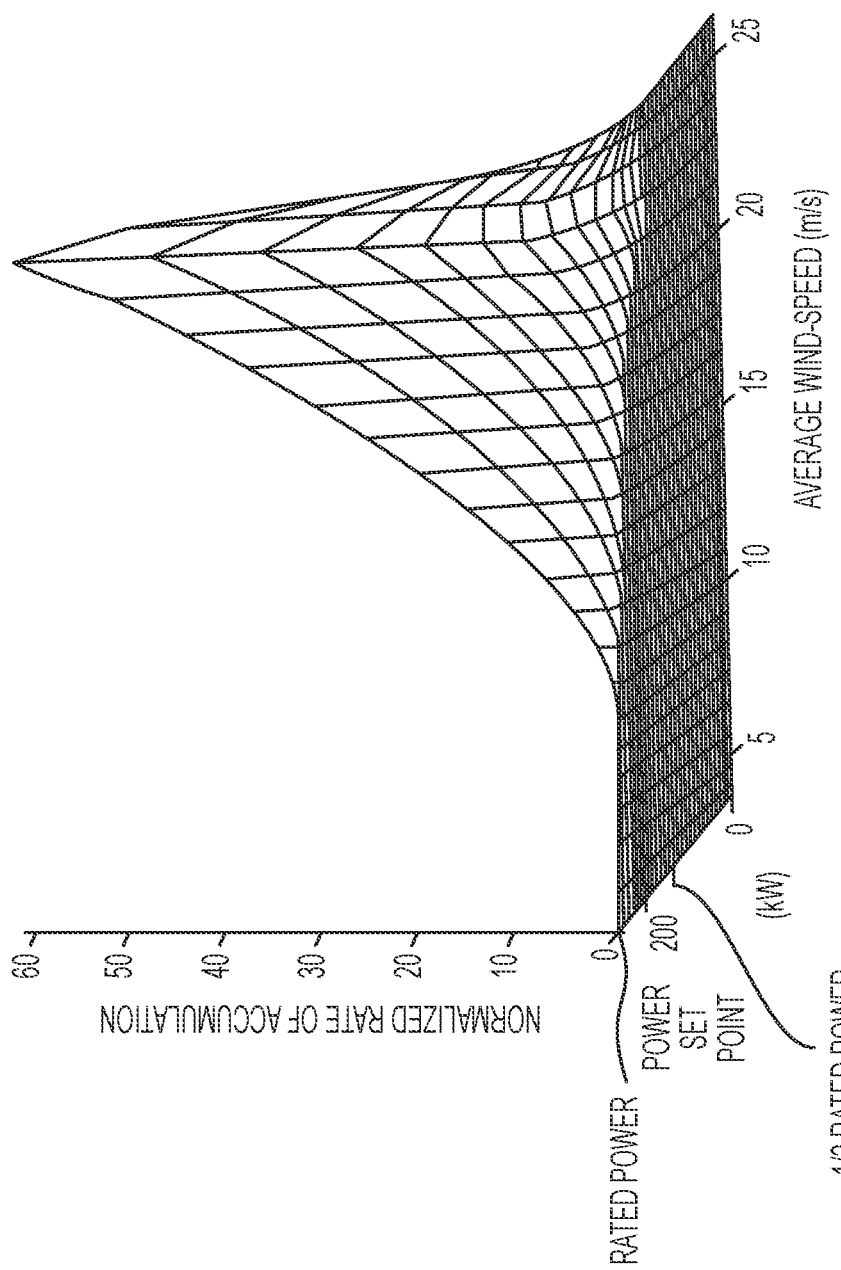
FIG. 4 is a graph illustrating rate of accumulation of turbine gearbox teeth fatigue damage incurred as a function of average wind speed.
Figure 5A:
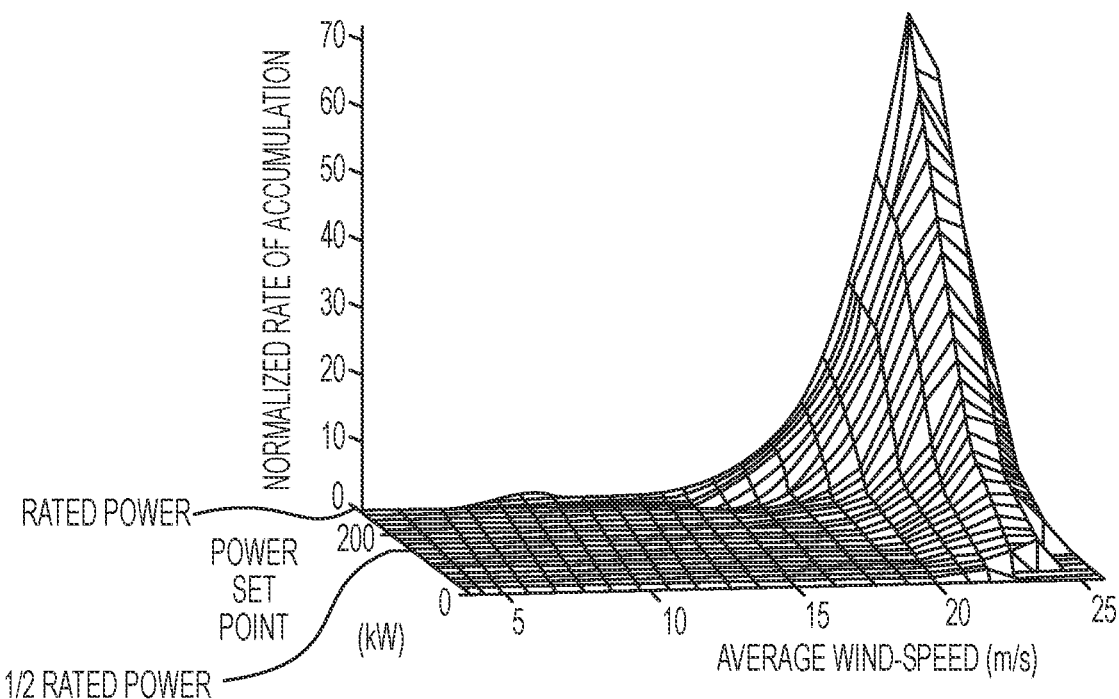
FIG. 5A is a graph illustrating rate of accumulation of general turbine structural fatigue damage incurred as a function of average wind speed.
Figure 5B:
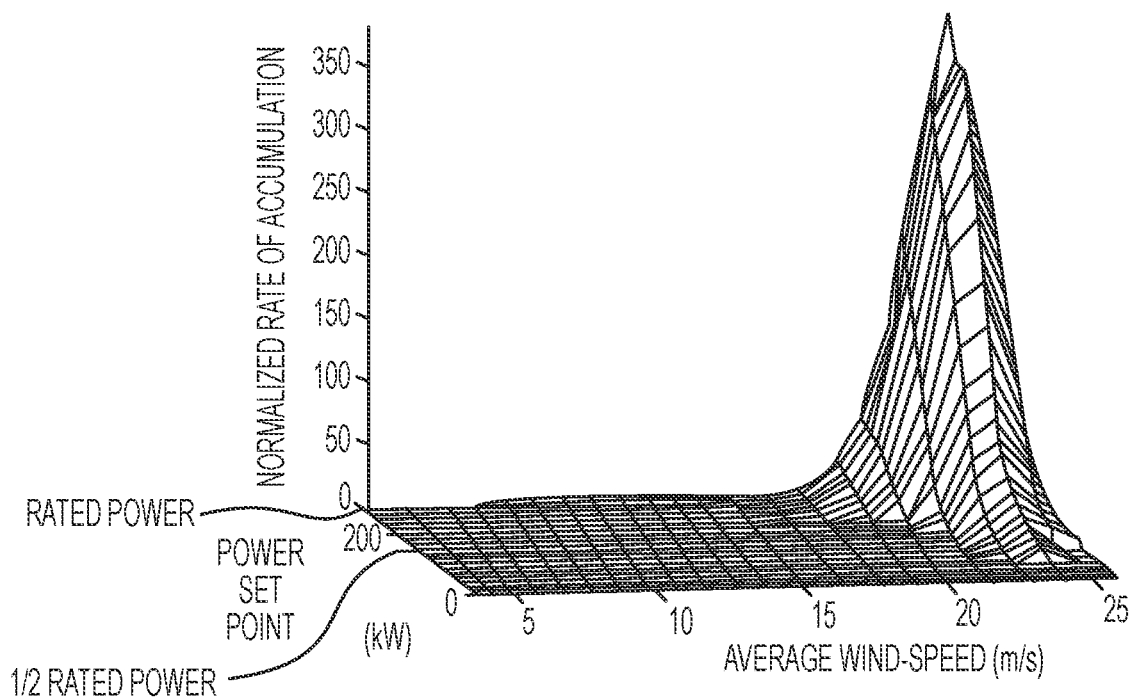
FIG. 5B is a further graph illustrating rate of accumulation of general turbine structural fatigue damage incurred as a function of average wind speed.
Figure 6:
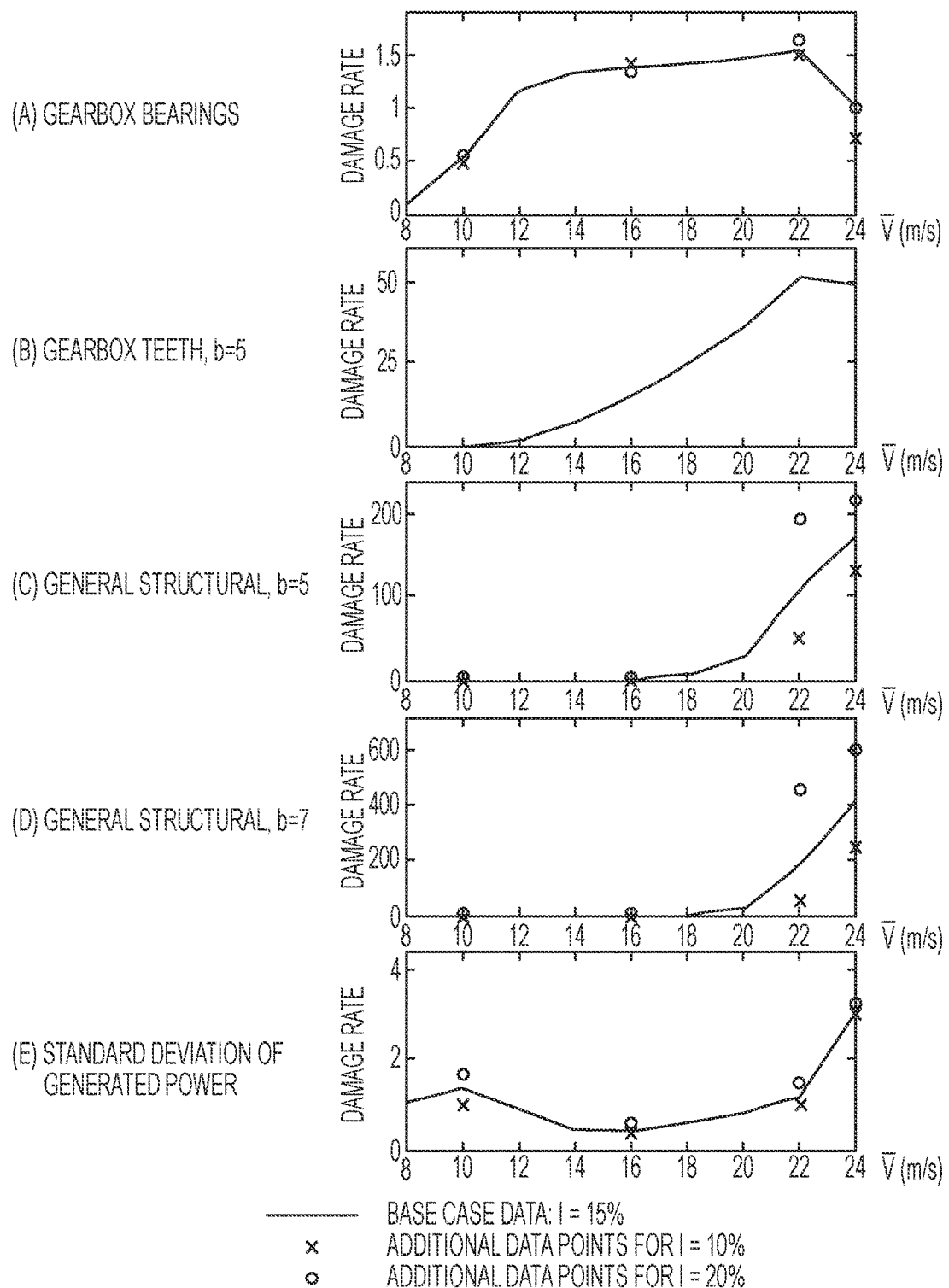
FIG. 6 is a series of graphs illustrating normalised rate of accumulation of fatigue damage for turbine components as a function of average wind speed for various turbulence intensities.

FIGS. 4, 5A, 5B and 6 show examples of the rate of accumulation of damage within wind turbine components as a function of average wind speed. FIG. 4 shows the rate of accumulation of gearbox teeth fatigue damage for varying average wind speeds and for different power set points for the turbine. FIGS. 5A and 5B show the same variables for general structural fatigue damage for different slope indexes. A slope index refers to the slope of the linear part of the S-N curve, plotted with the magnitude of cyclic stress on a linear scale versus number of cycles to failure on a log scale, and depends on the material of the component. As can be seen, rate of accumulation of fatigue damage increases non-linearly with power demand for many loads. FIG. 6 shows how damage rates for components may vary depending upon different turbulence intensity values, for operation at nominal power. FIG. 6 also shows how rate of accumulation of fatigue damage increases non-linearly with turbulence intensity for almost all loads.

In order to reduce the damaging effects caused by over-rating, knowledge of the fatigue damage used to date is applied to control turbine power output prior to the period during which over-rating is applied, so as to reserve or offset a certain amount of fatigue lifetime against that incurred during the predicted period of over-rating. Such control may include de-rating the turbine, restricting operation to rated power, or using less aggressive over-rating in advance to ensure that there is fatigue "in reserve" for over-rating when the time comes. Less aggressive over-rating may be achieved by putting a lower-than-normal cap on the maximum power level, using a lower controller gain (such that an over-rating signal is responded to at a lesser degree), or reducing the over-rating performed during high turbulence conditions for example.

Figure 7:
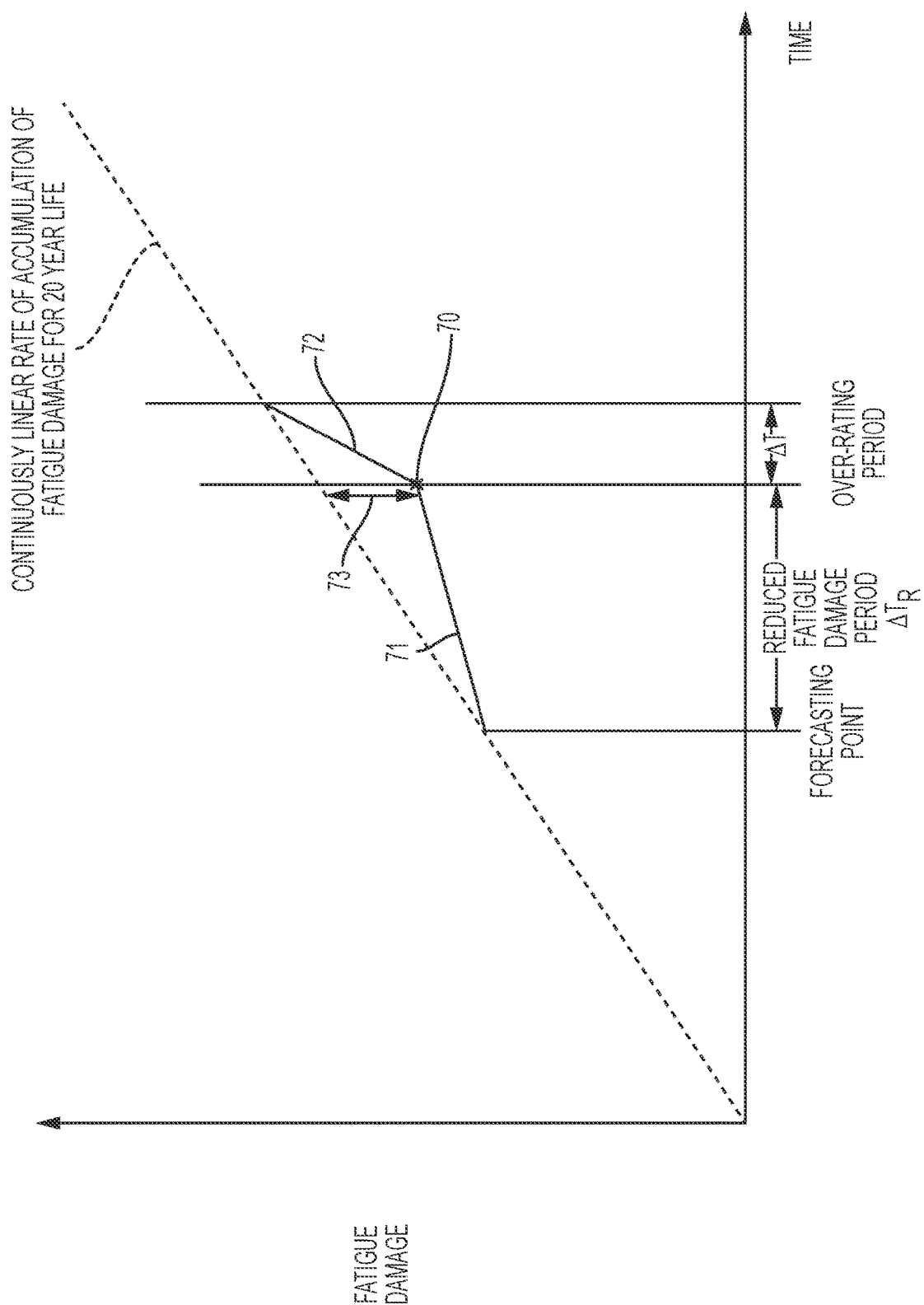
FIG. 7 is a graph illustrating an over-rating period and a preceding period of reduced fatigue damage in relation to a model of accumulation of fatigue damage over time.

FIG. 7 shows a graph of incurred fatigue damage against time. The dotted line represents a portion of a linear function for expected fatigue damage accumulated over an expected 20 year operating life of a wind turbine. The over-rating period $\Delta T$ is predicted using forecasting data. This prediction is made at the forecasting point, leaving a period of turbine operation $\Delta T_R$ prior to the over-rating period. It is during this period that the power output of the wind turbine is controlled to limit the total fatigue life consumed by the one or more turbine components. In particular, a comparison is made between the estimated fatigue damage of the one or more components and the expected fatigue damage according to the function represented by the dotted line. If the estimated fatigue damage of any of the one or more components is greater than the expected fatigue damage then the turbine is controlled to reduce the rate of consumption of fatigue life. Alternatively, to ensure that a greater amount of fatigue life is preserved in the components ahead of the period $\Delta T$, control to reduce the rate of consumption of fatigue life may be enacted if the estimated fatigue damage of any of the one or more components is greater than a fatigue reserve value offset 73 from the expected fatigue damage, for example control is enacted when the estimated fatigue damage is greater than the expected fatigue damage minus a constant reserve value.

As mentioned above, Lifetime Usage Estimators (LUEs) may be used to determine estimated fatigue damage for components. The loads that a given component experiences (be they bending moments, temperatures, forces or motions for example) may be measured or estimated and the amount of component fatigue life consumed calculated, for example using a well known technique such as a rainflow count and Miner's rule or a chemical decay equation. A device, module, software component or logical component for the measuring of the fatigue life consumed for a given turbine component may also be referred to as its Lifetime Usage Estimator, and the same acronym (LUE) will be used to refer to the algorithm for determining a lifetime usage estimate and the corresponding device, module or software or logic component. LUEs are described in more detail below.

A further, or alternative, control may be applied, whereby the rate of consumption of fatigue life (RLU) for the one or more components may be taken into account. If the measured RLU, at the RLU update point, is greater than the expected RLU of the function for expected fatigue damage, and would cause the LUE to exceed the expected fatigue damage, or the expected fatigue damage minus the reserve offset 73, in the period $\Delta T_R$ then the turbine power output may be controlled to reduce the RLU. This ensures a reserve or offset of a certain amount of fatigue lifetime against that incurred during the predicted period of over-rating $\Delta T$. Therefore, even if the LUE is below the expected fatigue damage at the forecasting point, the power output of the turbine may still be controlled to reduce fatigue damage ahead of period $\Delta T$.

Calculating the rate of consumption of fatigue life may comprise, for each component, periodically sampling the fatigue life consumed by the turbine component and determining the change in fatigue life consumed over the time period between the forecasting point and the current time, thus providing a rate of change of Lifetime Usage Estimation, or RLU. The RLU update point, being the point in time at which the RLU is determined, may be anywhere prior to the over-rating period $\Delta T$.

During the period $\Delta T_R$, LUEs, and optionally also RLUs, may be calculated repeatedly so that the control over the turbine power output can be modified if necessary. If the LUE rises above the expected, or offset, fatigue damage amount determined by the function, and/or if the RLU rises such that this would happen during the period $\Delta T_R$ if the RLU does not reduce, then the turbine can be controlled accordingly. Output power is reduced, or more stringent controls can be activated to reduce over-rating or further de-rate the turbine. In some embodiments updates to RLU may be limited to particular periods, such as during the initial part of the period $\Delta T_R$, for example over the first 50% of period $\Delta T_R$.

The LUEs, and optionally also the RLUs, may be calculated and compared with the expected damage function at intervals, which may be periodic. Alternatively calculation and comparison may be performed on a continuous basis.

Whilst FIG. 7 shows a straight-line linear function for the expected fatigue lifetime of turbine components, other functions may be used. These functions may take into account expected seasonal variations in fatigue damage, which will be higher during periods of higher average wind speed and turbulence such as during winter in the northern hemisphere. The expected fatigue damage may be based upon a long term average of fatigue damage, or may be specified in a pre-defined schedule, which may vary the rate of accumulation of fatigue damage over time.

The line 71 shows an example of the fatigue damage incurred during the period $\Delta T_R$ when control according to embodiments of the invention is applied. At the forecasting point it is determined that there is a period $\Delta T$ during which it would be desirable to over-rate the wind turbine. The desired value 70 for total fatigue damage, or fatigue life consumed, at the start of period $\Delta T$ is determined based upon the expected fatigue damage at the start of period $\Delta T$ according to a predetermined function. For example, the desired value may be the value of the predetermined function, or the value of the predetermined function minus an offset value. Periodic checking determines whether the fatigue life consumed is at or below the expected fatigue life, or the expected fatigue life minus the offset value 73. If it is not, then the turbine is controlled to minimise additional fatigue damage. In this manner, when the period $\Delta T$ is reached, the fatigue damage incurred will be offset below the expected fatigue damage by close to the desired amount. Over-rating (or additional over-rating) of the turbine may then be performed, with fatigue damage being incurred at a greater rate than during the period $\Delta T_R$, as indicated by example line 72.

In order to ensure that the fatigue damage incurred at the start of period $\Delta T$ is equal to or less than the desired fatigue damage indicated by point 70 it is also possible to use RLU values as mentioned above. The desired value 70 for total fatigue damage may be calculated as above, and the necessary RLU value required to achieve this by the start of period $\Delta T$ may be calculated based upon the current fatigue damage and the desired fatigue damage. The turbine power output can then be controlled to keep the RLU value at the calculated level, or within a particular tolerance of it, with periodic or continuous checks of the RLU value performed to ensure this.

During the period $\Delta T_R$ additional forecasting information may be received, resulting in an improvement to the forecast as the period $\Delta T$ approaches. Typically forecasts may be updated every 30 minutes or so, and accuracy for a given time period improves as that time period approaches. The improvement in the forecast may result in the starting time for period $\Delta T$ changing, as the period during which over-rating is desirable can be identified with greater precision. The control system may then increase or decrease the rate of accumulation of fatigue damage accordingly so that the desired accumulated fatigue damage 70 is reached by a time corresponding to the updated time at which period $\Delta T$ begins.

The period $\Delta T$ may initially be a window equal in length to a forecasting period. Typical forecasting methods may provide a window of 30 minutes for example. However, the period $\Delta T$ may increase in duration as period $\Delta T_R$ progresses and subsequent forecasting identifies further periods during which it would be desirable to over-rate. The value of the offset 73 below the expected fatigue damage value may, in such embodiments, be determined based upon the duration of period $\Delta T$ identified by forecast, and may be increased if the period $\Delta T$ increases. For example, if the period $\Delta T$ doubles because a second 30 minute window of desired over-rating is identified, then the offset may be doubled so that rate of lifetime usage is further decreased during period $\Delta T_R$ to the extent possible.

The period $\Delta T$ may have a duration of between 1 minute and 12 hours, depending upon the resolution of available forecasting. In particular, $\Delta T$ may be 30 minutes or around 30 minutes. The period $\Delta T_R$ may have a duration of between 1 minute and 3 days, depending upon how far into the future the available forecasting reaches. In particular, $\Delta T_R$ may be 12 hours, or around 12 hours, to permit sufficient time to build up a reserve of available fatigue life.

Figure 8:
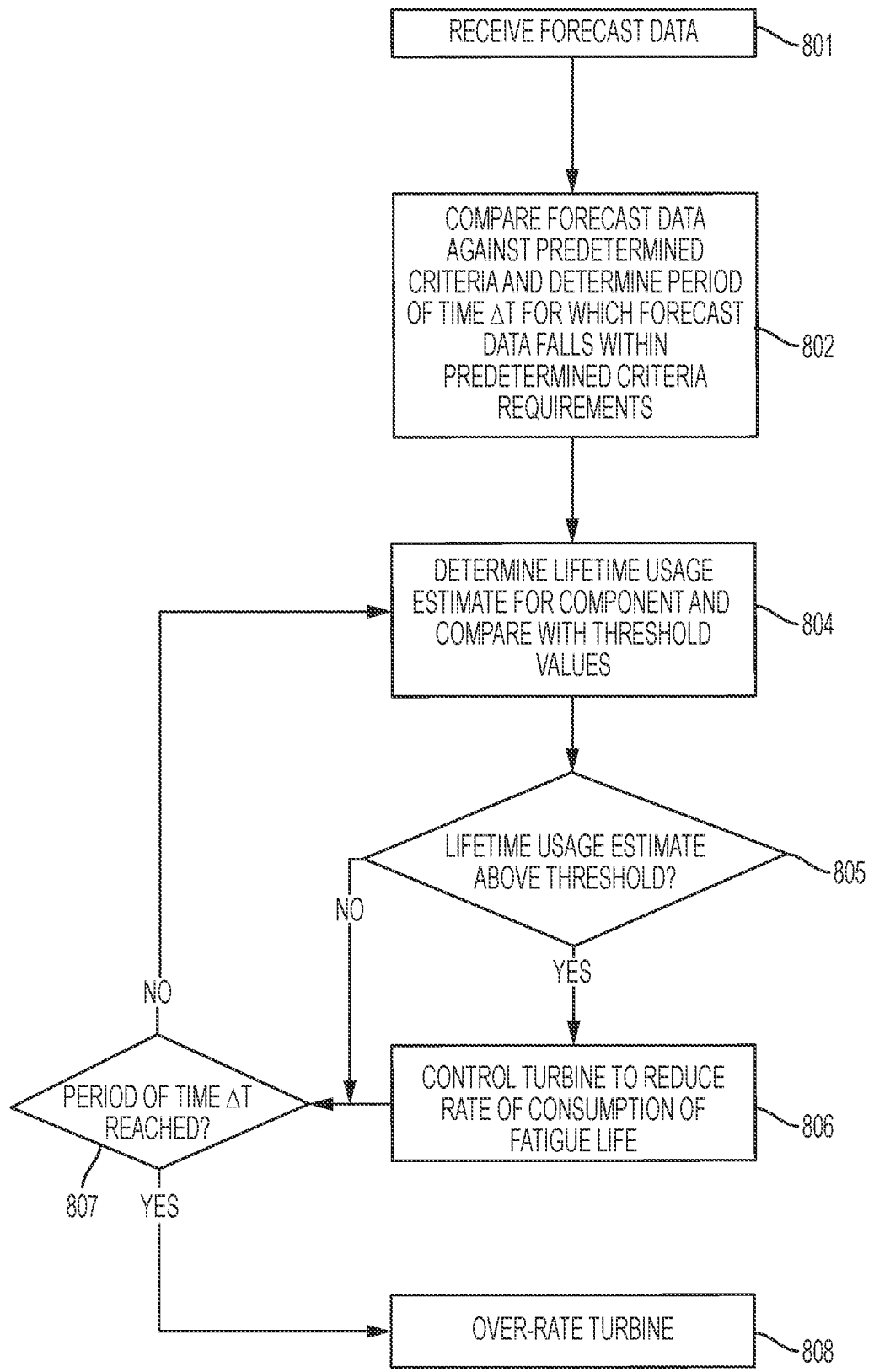
FIG. 8 is an example of a method according to an embodiment of the invention.

FIG. 8 shows an example of a method that may be employed by a wind turbine controller, or a PPC, to implement embodiments of the present invention. The forecast data is received at step 801. This data may be provided from one or more wind park sensors, or from any other appropriate source. For example, the forecast data may be received over a communications network such as the internet.

The forecast data is then compared against predetermined criteria to identify periods of time during which over-rating would be desirable at step 802. The predetermined criteria may be criteria relating to weather data and/or electricity pricing data. The weather data may include predicted wind speed and/or turbulence intensity over a particular future period. Wind-speed data is used first to determine periods in which over-rating may be possible, that is, periods covered by the prediction data in which the wind speed is within the range of wind-speeds in which power output can exceed rated power. For example, the range of wind speeds may be 12 m/s to 25 m/s. The weather data may include predicted values for turbulence intensity over a particular future period. Periods during which over-rating would be desirable may then be determined as periods that meet the wind speed requirements and that also have predicted turbulence intensities below a maximum turbulence intensity threshold. For example, the maximum turbulence intensity may be 16%. The electricity pricing data may include predicted electricity prices over a particular future period. Periods during which over-rating would be desirable may then be determined as periods covered by the prediction data where electricity prices exceed a minimum pricing threshold, in addition to, or instead of, the turbulence criterion.

At step 804 lifetime usage estimates for one or more wind turbine components are determined, and compared with threshold values. The threshold values are determined based upon the linear expected function shown in FIG. 7, or any other function used to predict fatigue damage incurred over the lifetime of the turbine. As such, the threshold values for fatigue damage vary over time.

At step 805 it is determined whether the LUEs for the components are above or below their respective thresholds for acceptable fatigue lifetime usage. It should be noted that LUEs may be determined for different components separately, and that subsequent control to reduce rate of consumption of fatigue life may be performed if only one component exceeds its lifetime usage estimate threshold. In the event that a threshold is exceeded the turbine is controlled to reduce consumption rate of fatigue life at step 806 as described above.

Steps 804 to 806 may be repeated intermittently, periodically or continuously until the period of time $\Delta T$ is reached and over-rating of the turbine begins at step 808.

An additional step may be provided, after step 804 or 805, to determine whether the rate of consumption of fatigue life is above a threshold RLU value and/or would cause the lifetime usage estimate to move above the LUE threshold if maintained for the period prior to period $\Delta T$. A positive result may require control of the turbine to reduce the rate of consumption of fatigue life, even if the LUEs for the various components are currently below the threshold. As with the LUE calculations at steps 804 and 805, these steps may be performed individually for all monitored components, and a single positive result may be sufficient to require control of the turbine to reduce rate of consumption of fatigue life.

The steps described in FIG. 8 may be performed centrally at the PPC, locally in the wind turbine controllers, or remotely via a communications network. It is also possible for the various steps to be performed in a distributed manner. The receipt and analysis of forecast data, and the determination of times during which over-rating is desirable, may be performed remotely from the turbine or power plant and the resulting data delivered to the PPC, turbine controller or other controller. The remaining steps may be performed at, or distributed between, turbine controllers or at a central controller as appropriate.

Turbine Optimiser Example

Figure 9:
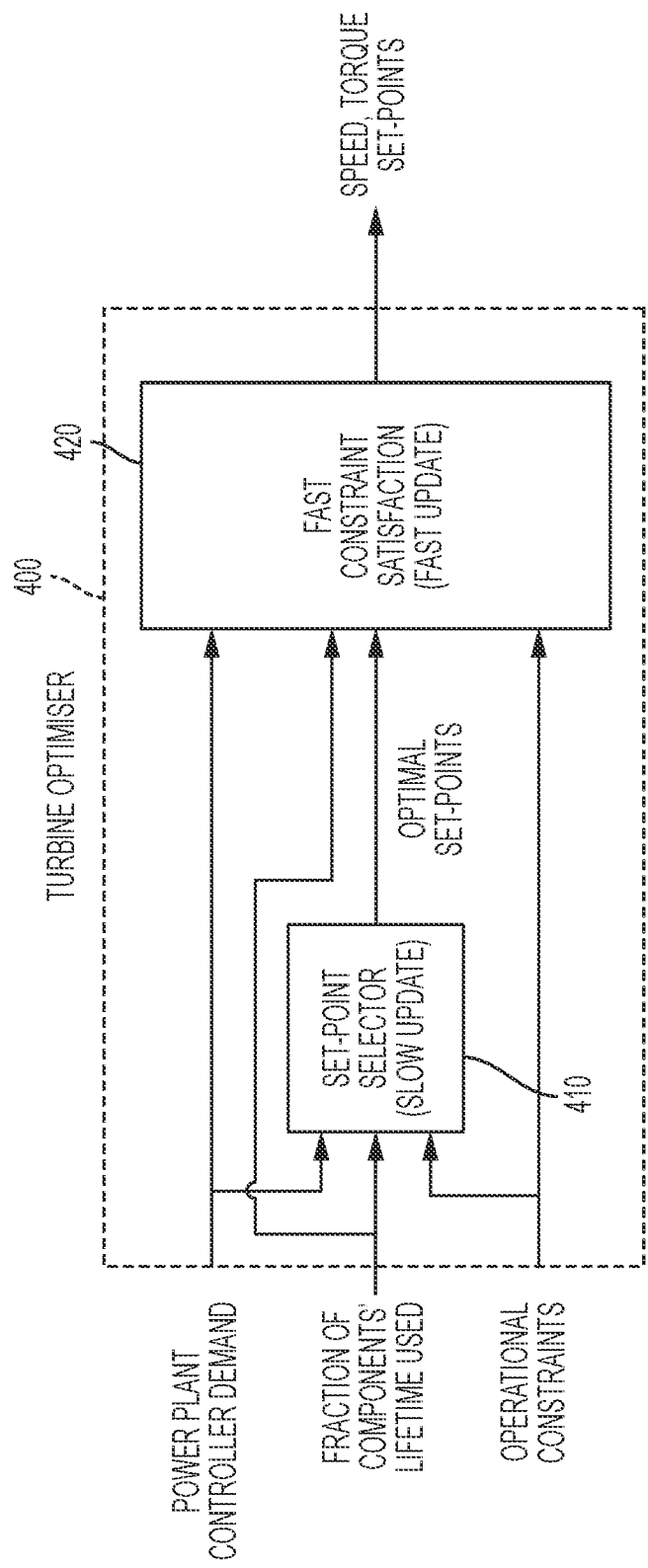
FIG. 9 illustrates a turbine optimiser.

FIG. 9 shows an example of a wind turbine optimiser that may be used in conjunction with any of the embodiments of the invention described herein. The turbine optimizer operates the turbine at a power level that does not exceed that sent by the PPC and outputs the optimal level of torque and speed based on information from the lifetime usage estimator and the PCC. As can be seen from FIG. 9, the turbine optimiser 400 includes a set-point selector 410 and a fast constraint satisfaction unit 420. The set-point selector receives as its inputs the PPC over-rating demand, the lifetime usage data for the major components as described above and optionally also operational constraints from an operational constraints controller (OCC).

OCCs may be used in order to prevent the components whose lifetime used is not measured with an LUE from reaching their fatigue limits, and also to prevent components from exceeding extreme limits. OCCs may include constraints placed on the turbine operation based upon values of measurable signals, for example temperature or electrical current. Operational constraint controllers (OCCs) define how the turbine's behaviour should be restricted in order to prevent the measured signals from exceeding these operational constraints or triggering alarms which may result in turbine shutdown. Operational constraints limit the possible over-rating set point signal as a function of various operating parameters. For example, where a protection function is in place to initiate shut down when the gearbox oil temperature exceeds 65° C. as mentioned above, an operational constraint may dictate a linear decrease in the maximum possible over-rating set point signal as a function of gearbox oil temperature for temperatures over 60° C., reaching "no over-rating possible" (i.e., a power set-point signal equal to the nominal rated power) at 65° C.

In the example of FIG. 9 the input is the absolute value of lifetime usage rather than the rate of usage. The set-point selector outputs optimal set-points to the fast constraint satisfactions unit periodically, for example between every minute and every few minutes. The fast constraint satisfaction unit 420 also receives as inputs the PCC demand signal, the lifetime usage data and the operating constraints and outputs speed and torque set points periodically. In the example shown, set-points are output at the frequency of demand signals received from the PPC. Of the components for which lifetime usage is determined, each will be classified as speed sensitive if the damage accumulated correlates with speed over-rating percentage only and torque sensitive if the damage accumulated correlates with the torque over-rating percentage only. Components may be generic if they are sensitive to both torque and speed. As mentioned, the set point selector 410 chooses the optimal speed and torque set-points. This is done on a slow time scale $T_s$ which is in the order of minutes. The Set-Point Selector update rate $T_s$, is chosen to maximise performance whilst ensuring the over-rating controller does not interfere with existing controllers in the turbine software.

The set-point selector 410 receives the lifetime usage estimates for all estimated components and selects the value corresponding to the most damaged component; that with the greatest used life. If that component has consumed more of its fatigue life than it has been designed to have used at that point in time the set-point selector outputs optimal speed and power set-points equal to their respective rated values. Thus, in that circumstance there is no over-rating.

If any of the speed sensitive components have used more of their fatigue lives than their design value at that point in time, the set-point selector outputs an optimal speed set-point equal to rated speed and if any of the torque sensitive components have used more of their fatigue lives than their design value at that point in time, the set-point selector outputs an optimal torque set-point equal to rated torque. The set-point selector chooses an optimal set-point to maximise the power produced subject to constraints from the PPC and operational constraint controllers sampled at the beginning of the time-step. The set-point selector also attempts to equalize the damage to the most damaged speed and torque sensitive components.

The fast constraint satisfaction unit 420 in this example operates at a higher frequency than the set-point selector and applies saturations to the optimal speed and torque set-points, limiting the outputs to the limits provided by the OCCs and PPC. The fast constraint satisfaction block 420 does not allow the optimiser to send set points over-rated by speed/torque if any of the speed/torque sensitive components have consumed more than their target life. Similarly, the optimiser will not send an over-rated power set-point if any of the generic components have consumed more than their target life.

Embodiments of the invention may be applied as a further functional unit within the turbine optimiser, or that acts on the output of the turbine optimiser, to further reduce rate of increase of LUE values to ensure that fatigue usage levels in components have sufficient amounts in reserve to allow increased over-rating during predicted future periods.

Generally the embodiments described contemplate over-rating based on torque and speed. Over-rating may also be used in constant speed turbines, for example constant speed active stall turbines. In this case, only the power signal is over-rated and each turbine in the power plant, or each turbine in a subset of the power plant, sends an over-rating demand to the PPC which monitors the total output and reduces the amount of over-rating if the total output is above the rated output of the power plant. Alternatively only the power signal may be overrated. In practice, this is likely to be rarely necessary as, dependent on weather conditions, not all turbines will be over-rating and some may not be generating any power, for example as they are shut down for maintenance. Alternatively, a power regulation model uses a control loop which compares wind speed input data from each turbine to known power curves to predict how much power each turbine can produce at any given time. The PRM sends individual power demands to each turbine with the objective to obtain as close to power plant rated power as possible. The PRM may be used with an extended power curve for an over-rated turbine. Control during periods prior to desirable over-rating periods may be employed as described herein. Therefore, embodiments of the invention may be applied to both constant-speed and variable-speed turbines.

The controllers, functions and logic elements described herein may be implemented as hardware components or software executing on one or more processors located at the wind turbines, the PPC or a remote location, or a combination thereof.

The control methods described herein may be implemented directly in a turbine controller. Alternatively, the methods may be implemented in a local site controller, such as a wind power plant controller, where the control function is applied, individually, to a plurality of wind turbines and the output power demand of the control function is then applied to the individual turbine controllers. Alternatively the methods may be implemented remotely in a similar manner. The methods may, in some embodiments, be implemented as part of an over-rating controller, which controls the amount of power generated above rated power by over-rating the turbine. In other embodiments the controller may be used to control de-rating of a turbine, reducing power below rated power using input from LUEs.

Lifetime Usage Estimators

Embodiments of the invention, as described above, make use of Lifetime Usage Estimators (LUEs). The lifetime usage estimators will now be described in more detail. The algorithm required to estimate lifetime usage will vary from component to component and the LUEs may comprise a library of LUE algorithms including some or all of the following: load duration, load revolution distribution, rainflow counting, stress cycle damage, temperature cycle damage, generator thermal reaction rate, transformer thermal reaction rate and bearing wear. Additionally other algorithms may be used. As mentioned above, lifetime usage estimation may only be used for selected key components and the use of a library of algorithms enables a new component to be selected for LUE and the suitable algorithm selected from the library and specific parameters set for that component part.

In one embodiment, LUEs are implemented for all major components of the turbine including the blade structure, the blade bearings and bolts, the blade pitch system, the main shaft and bearing system, the gearbox (including gear-tooth contact point, gearbox gear-tooth root bending and/or gearbox bearings), the generator (including windings, bearings and/or terminal box cables), the converter, the transformer (including transformer windings), the yaw system, the tower and the foundation. Alternatively a selection of one or more of the LUEs may be made.

As examples of the appropriate algorithms, rainflow counting may be used in the blade structure, blade bolts, pitch system, main shaft system, converter, yaw system, tower and foundation estimators. In the blade structure algorithm, the rainflow count is applied to the blade root bending flapwise and edgewise moment to identify the stress cycle range and mean values and the output is sent to the stress cycle damage algorithm. For the blade bolts, the rainflow count is applied to the bolt bending moment to identify stress cycle range and mean values and the output sent to the stress cycle damage algorithm. In the pitch system, main shaft system, tower and foundation estimators the rainflow counting algorithm is also applied to identify the stress cycle range and mean values and the output sent to the stress cycle damage algorithm. The parameters to which the rainflow algorithm is applied may include:

Pitch system—pitch force;
Main shaft system—main shaft torque;
Tower—tower stress;
Foundation—foundation stress.

In the yaw system the rainflow algorithm is applied to the tower top torsion to identify the load duration and this output is sent to the stress cycle damage algorithm. In the converter, generator power and RPM is used to infer the temperature and rainflow counting is used on this temperature to identify the temperature cycle and mean values.

Lifetime usage in the blade bearings may be monitored either by inputting blade flapwise load and pitch velocity as inputs to the load duration algorithm or to a bearing wear algorithm. For the gearbox, the load revolution duration is applied to the main shaft torque to calculate the lifetime used. For the generator, generator RPM is used to infer generator temperature which is used as an input to the thermal reaction rate generator algorithm. For the transformer, the transformer temperature is inferred from the power and ambient temperature to provide an input to the transformer thermal reaction rate algorithm.

Where possible it is preferred to use existing sensors to provide the inputs on which the algorithms operate. Thus, for example, it is common for wind turbines to measure directly the blade root bending edgewise and flapwise moment required for the blade structure, blade bearing and blade bolts estimators. For the pitch system, the pressure in a first chamber of the cylinder may be measured and the pressure in a second chamber inferred, enabling pitch force to be calculated. These are examples only and other parameters required as inputs may be measured directly or inferred from other available sensor outputs. For some parameters, it may be advantageous to use additional sensors if a value cannot be inferred with sufficient accuracy.

The algorithms used for the various types of fatigue estimation are known and may be found in the following standards and texts:

Load Revolution Distribution and Load Duration:
    Guidelines for the Certification of Wind Turbines, Germainischer Lloyd, Section 7.4.3.2 Fatigue Loads Rainflow:
    IEC 61400-1 'Wind turbines—Part 1: Design requirements, Annex G Miners Summation:
    IEC 61400-1 'Wind turbines—Part 1: Design requirements, Annex G Power Law (Chemical Decay):
    IEC 60076-12 'Power Transformers—Part 12: Loading guide for dry-type power transformers', Section 5.

The invention claimed is:

1. A method of controlling a wind turbine, the method comprising:
identifying, based on forecast data, one or more future periods of time during which the wind turbine is to be over-rated;
determining, prior to the one or more future periods, a fatigue life consumed by one or more turbine components, wherein determining the fatigue life comprises determining a first lifetime usage estimate value and a first rate of consumption of the fatigue life;
for a first future period of the one or more periods, determining a target value for the fatigue life consumed at a start of the first future period, wherein the target value is an expected fatigue value for the one or more turbine components at the start of the first future period, minus an offset value;
prior to the start of the first future period, controlling a power output of the wind turbine in accordance with the target value for the fatigue life, wherein the fatigue life is consumed at a second rate of consumption that is less than the first rate of consumption; and
over-rating the wind turbine during the first future period, wherein the fatigue life is consumed at a third rate of consumption that is greater than the first rate of consumption.

2. The method of claim 1, further comprising:
obtaining, from one or more sensors of the wind turbine, values of variables affecting the fatigue life of the one or more turbine components; and
applying one or more lifetime usage estimator algorithms to the variables to determine measures of the fatigue life consumed by each of the one or more turbine components.

3. The method of claim 1, wherein the data identifying the one or more future periods of time includes:
receiving forecast data forecasting one or more external conditions; and
determining, from the forecast data, periods during which one or more parameters from the forecast data are beyond a respective threshold.

4. The method of claim 1, wherein controlling the power output of the wind turbine comprises reducing the power output in response to a signal indicative of turbulence during periods of high turbulence in which turbulence intensity exceeds a threshold value.

5. The method of claim 1, wherein controlling the power output of the wind turbine comprises reducing the amount of over-rating applied.

6. The method of claim 1, wherein controlling the power output of the wind turbine comprises de-rating the turbine below rated power.

7. The method of claim 1, further comprising:
determining whether the fatigue life consumed by the one or more turbine components exceeds respective threshold values;
wherein limiting the fatigue life consumed by the one or more turbine components prior to the one or more future periods of time is applied when the fatigue life consumed by the one or more turbine components exceeds the respective threshold values.

8. The method of claim 7, further comprising, continuously or at intervals, determining the fatigue life and determining whether the fatigue life consumed by the one or more turbine components exceeds respective threshold values prior to the one or more future periods of time.

9. The method of claim 1, further comprising:
repeating, continuously or at intervals, determining a rate of consumption of the fatigue life and a lifetime usage estimate value; and
controlling the power output based upon whether the rate of consumption of the fatigue life causes the lifetime usage estimate value to exceed a lifetime usage estimate threshold.

10. The method of claim 1, wherein the forecast data includes weather forecast data.

11. The method of claim 1, wherein the data identifying the one or more future periods of time is obtained by:
receiving forecast data forecasting one or more external conditions; and
determining, from the forecast data, periods during which one or more parameters from the forecast data are beyond a respective threshold;
wherein the forecast data includes wind speed data, the one or more parameters include a wind speed, and the respective threshold is a minimum wind speed, and wherein the determining periods during which one or more parameters from the forecast data are beyond the respective threshold comprises:
determining periods during which the wind speed is above the respective threshold.

12. The method of claim 1, wherein the data identifying the one or more future periods of time is obtained by:
receiving forecast data forecasting one or more external conditions; and
determining, from the forecast data, periods during which one or more parameters from the forecast data are beyond a respective threshold;
wherein the forecast data includes a forecast of turbulence intensity, and wherein the respective threshold is a maximum turbulence intensity, and wherein the determining periods during which one or more parameters from the forecast data are beyond the respective threshold comprising:
determining periods during which the turbulence intensity is below the respective threshold.

13. The method of claim 1, wherein the forecast data includes data indicative of a price of electricity at a defined future time.

14. The method of claim 1, wherein controlling the power output of the wind turbine comprises reducing the power output in response to a signal indicative of electricity prices during periods of low price of electricity in which the price of electricity is less than a threshold value.

15. The method of claim 1, wherein the data identifying the one or more future periods of time is obtained by:
receiving forecast data forecasting one or more external conditions; and
determining, from the forecast data, periods during which one or more parameters from the forecast data are beyond a respective threshold;
wherein the forecast data includes an electricity price, and the respective threshold is a minimum electricity price, and wherein the determining periods during which one or more parameters from the forecast data are beyond the respective threshold comprising:
determining a period during which the price of electricity is above the respective threshold.

16. The method of claim 1, further comprising controlling the power output of the wind turbine by preventing over-rating prior to the one or more future periods.

17. The method of claim 1, wherein reducing power output comprises one or both of reducing the generator current demand and reducing the rotational speed demand.

18. The method of claim 1, wherein the wind turbine is an active stall turbine.

19. A controller for a wind turbine, the controller being configured to:
determine, prior to one or more future periods of time during which the wind turbine is to be over-rated, a fatigue life consumed by one or more turbine components, wherein determining the fatigue life comprises determining a first lifetime usage estimate value and a first rate of consumption of the fatigue life;
for a first future period of the one or more periods, determine a target value for the fatigue life consumed at a start of the first future period, wherein the target value is an expected fatigue value for the one or more turbine components at the start of the first future period, minus an offset value;
prior to the start of the first future period, control a power output of the wind turbine in accordance with the target value for the fatigue life, wherein the fatigue life is consumed at a second rate of consumption that is less than the first rate of consumption; and
during the first future period, allow the wind turbine to be over-rated, wherein the fatigue life is consumed at a third rate of consumption that is greater than the first rate of consumption.

20. The controller of claim 19, further configured to:
obtain data identifying, based on forecast data, the one or more future periods of time during which the wind turbine is to be over-rated.

21. A controller for a wind power plant, the controller being configured to, for each wind turbine of a plurality of wind turbines:
in advance of one or more future periods of time identified based on forecast data, limiting a fatigue life consumed by one or more turbine components of the wind turbine by sending a control signal to control a power output of the wind turbine based upon target values of the fatigue life consumed at respective starts of the one or more future periods, wherein the target values are respective expected fatigue values for the one or more turbine components at the respective starts, minus an offset value, wherein controlling the power output of the wind turbine comprises, prior to the start of a first future period of the one or more future periods, controlling a power output of the wind turbine in accordance with a target value of the target values of the fatigue life, wherein the fatigue life is consumed at a second rate of consumption that is less than a first rate of consumption indicated by the fatigue life; and allow the wind turbine to be over-rated during the one or more future periods, wherein during over-rating the fatigue life is consumed at a third rate of consumption that is greater than the first rate of consumption.

22. The controller of claim 21, further configured to control a power output of the wind turbine by preventing over-rating prior to the one or more future periods.

23. The controller of claim 21, wherein the wind turbine is an active stall turbine.

24. The method of claim 1, wherein during the first future period, the power output is controlled in accordance with an expected fatigue value for the one or more turbine components at an end of the first future period.

\* \* \* \* \*